Nov. 6, 1962   P. E. DUNSTAN   3,062,560
HAND PROPELLED CHILD'S VEHICLE
Filed Jan. 23, 1961

INVENTOR.
PHILLIP E. DUNSTAN
BY
Robinson + Berry
ATTORNEYS

United States Patent Office 3,062,560
Patented Nov. 6, 1962

3,062,560
HAND PROPELLED CHILD'S VEHICLE
Phillip E. Dunstan, 1022 S. 208th, Seattle, Wash.
Filed Jan. 23, 1961, Ser. No. 84,138
4 Claims. (Cl. 280—208)

This invention relates to improvements in wheeled vehicles as designed especially for use by children. More particularly, it relates to a wheeled vehicle comprised by a pair of laterally spaced annular wheels or rims by and between which a platform is mounted for the rolling conveyance thereon of a child while standing or sitting on the platform; the present device being an improvement as applied to such vehicles as those of United States patents issued under Numbers 2,399,874; 1,673,774; and 186,379.

It is the principal object of this invention to provide a mobile vehicle of the character above recited that permits a person, usually a child, to stand or sit on the platform as supported by and between the laterally spaced wheels, in a well balanced position and in that position to easily grasp and apply rolling force to the annular wheels or rims; these being of such diameter as to give the rider's hands while he rides on the platform, easy and natural access thereto for propulsion of the vehicle in forward or rearward direction.

It is also an object of the present invention to equip the platform on which the rider stands, at points within its ends, with supporting rollers for guided rolling travel on the inner peripheries of the paired rims or wheels and with other rollers, at its outer ends, in rolling contact with the outside peripheries of the rims that are adapted to coact with said supporting rollers to hold the annular wheels in upright, parallel relationship, and which outside rollers may also be employed as stops to limit the angular travel of the platform in the event the rider loses his balance, allowing him to step off the vehicle and regain his balance, thus avoiding a fall.

Further objects and advantages of the present invention reside in the details of construction and combination of parts and in their mode of assembly, use and operation, as will herein be disclosed as the specification progresses.

In accomplishing the above mentioned and various other objects of the invention, I have provided the improved details of construction, the preferred forms of which are illustrated in the accompanying drawings, wherein.

Referring more in detail to the drawings:

In its present preferred form, the vehicle of this invention comprises two laterally spaced, axially aligned annular wheels, rings or rims 10—10, supported vertically and in spaced parallel relationship by a platform 12 that is disposed between them with its opposite side edge portions located closely adjacent the spaced wheels 10—10 and projecting forwardly and rearwardly across their lower arcuate portion.

At their forward and rearward ends, the opposite side rails 12' of the platform 12 are equipped with rollers 15—15 that engage in rolling contact with the outer peripheries of the paired wheels or rims 10—10. Likewise, each side rail 12' of the platform mounts paired supporting wheels 16—16 thereon for rolling contact upon the inside peripheral edges of the wheels or rims within the spaced limits of rollers 15—15.

Figure 1:
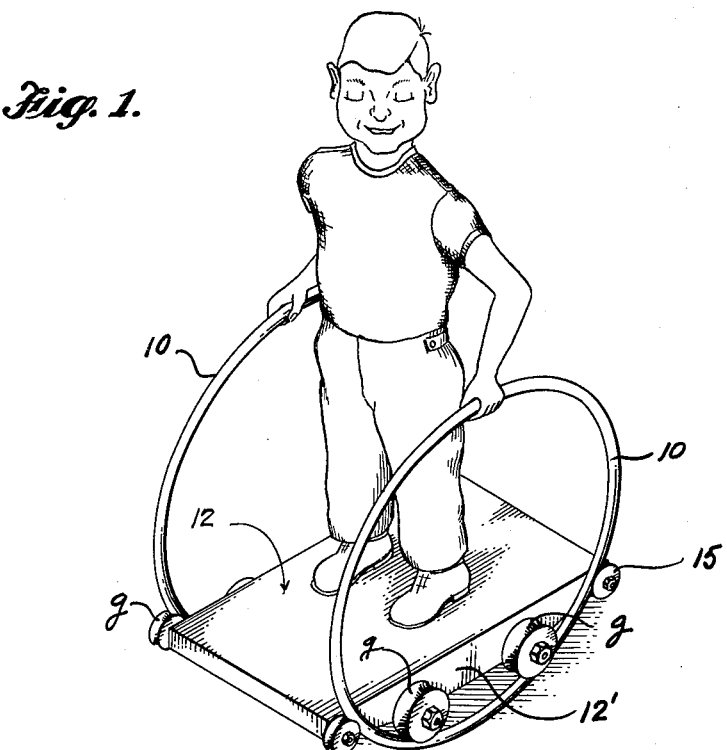
FIG. 1 is a perspective view of the vehicle of the present invention, showing a child standing on the rider's platform and grasping the annular wheels or rims as for the propulsion of the vehicle.
Figure 2:
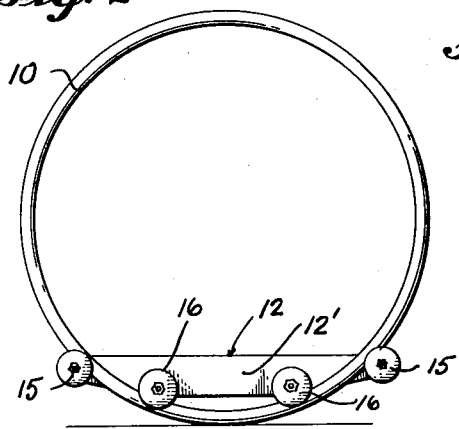
FIG. 2 is a side elevation of the vehicle of FIG. 1.

The rollers 15—15 and also rollers 16—16 are peripherally grooved, as shown at g in FIG. 1 for their guided rolling travel on the rims. The disposition of these four rollers at each side is such that they cooperate to retain all rollers seated in rolling contact with the rims as shown. Also, the relationship of inside and outside rollers is such that they serve to support the annular rims 10—10 in upright positions and in parallel planes.

Figure 4:
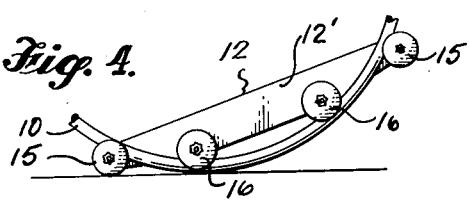
FIG. 4 is a fragmental side view of a part of the vehicle showing the rider's platform as tilted to effect braking of the vehicle by the engaging of the wheels at the lower end of the platform with the supporting surface on which the vehicle is supported.

In the use of the vehicle, the user whether child or adult, may either stand or sit on the platform 12 and easily grasp the rims 10—10, as indicated, in FIG. 1 to apply forward or rearward propelling force thereto. Travel of the vehicle may be braked or stopped by the operator shifting his weight and grasping the annular rims. Loss of balance by the operator will cause either the forward or rearward end of the platform to tilt downwardly and cause the end set of rollers to be pressed against the supporting surface as has been shown in FIG. 4 enabling the operator to step off and regain his balance, thus avoiding a fall.

Turning is accomplished by causing one wheel to be moved faster than the other or one is held while the other is turned, or turning the wheels in opposite directions.

Figure 3:
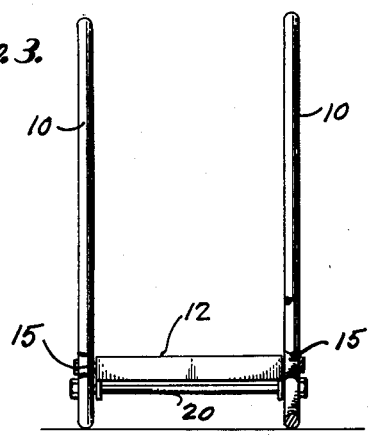
FIG. 3 is an end elevation of the vehicle of FIG. 1.

The vehicle, as shown, may be used best on floors or hard surfaced pavements on which it is normally easy to propel. It may be made in various sizes as may be required or desired. Rollers and rims 10—10 may be made of aluminum. The platform is of wood, or metal. Wheels may be mounted in various ways on cross axles as indicated at 20 in FIG. 3 or on stub axles fixed to the sides of the platform. A feature of the invention resides in the fact that the height of the wheels or rims above the platform is such as to afford the easiest gripping position for the user whether sitting or standing.

I claim:

1. A vehicle of the character described comprising a pair of laterally spaced and axially aligned annular wheels of equal diameter, a platform disposed horizontally between said laterally spaced wheels and across the lower chords thereof for support of a rider thereon, a pair of platform supporting rollers mounted on each of the opposite side surfaces of said platform in rolling contact with the inside peripheral edge surfaces of the annular wheels for the functional support of the platform, another pair of rollers mounted on each of the opposite sides of the platform in rolling engagement with the outer peripheral surfaces of the annular wheels at a higher level than the level of the first mentioned pairs of rollers and coacting therewith in maintaining spacing and parallel relationship of said annular wheels.

2. A vehicle according to claim 1 wherein each of said rollers as engaged with the annular wheels is circumferentially grooved for its guided travel and retention on the annular wheels.

3. A vehicle according to claim 1 wherein the rollers of the second mentioned pairs are applied to the platform at the forward and rearward end thereof and respectively are adapted to be engaged in rolling contact with the supporting surface on which the vehicle is traveling by forward or rearward tilting of the platform.

4. A vehicle according to claim 3 wherein the diameter of said wheels is such that the height of their upper chords above the platform level would be substantially at the hand level of a boy rider standing on the platform.

References Cited in the file of this patent

UNITED STATES PATENTS

| | | |
|---|---|---|
| 186,379 | Stineman et al. | Jan. 16, 1877 |
| 1,189,909 | Bemis | July 4, 1916 |
| 2,399,874 | Livingston | May 7, 1946 |